United States Patent [19]

Brimaud

[11] 4,261,445
[45] Apr. 14, 1981

[54] CROWN BRAKES

[75] Inventor: Gilbert Brimaud, Paris, France

[73] Assignee: Societe Anonyme Francaise du Ferodo, Paris, France

[21] Appl. No.: 73,749

[22] Filed: Sep. 10, 1979

[30] Foreign Application Priority Data

Sep. 13, 1978 [FR] France ................. 78 26268

[51] Int. Cl.³ .......................................... F16D 53/00
[52] U.S. Cl. ................................. 188/76; 188/73.3
[58] Field of Search ..................... 188/73.3, 76, 365

[56] References Cited

U.S. PATENT DOCUMENTS 3,853,207  12/1974  Rist ........................................ 188/76

Primary Examiner—Duane A. Reger
Attorney, Agent, or Firm—Charles E. Brown

[57] ABSTRACT

The invention relates to internal-external shoe drum brakes, or so-called "crown" brakes in which the braking member is a drum or crown having braking surfaces formed on the annular inner and outer surfaces.

The brake is provided with a calliper mounted on a fixed bracket, the calliper surrounding the crown and being adapted to apply brake shoes mounted on either side of the crown against the braking surfaces.

The calliper is mounted on the fixed bracket for radial movement with respect to the crown and to this end is provided with at least one transverse lug formed with an aperture which slidably engages a guide pin mounted on the fixed bracket.

The guide lug is formed separately from the calliper and is detachably secured thereto so that it can be released from the calliper when it is desired to change the brake shoes.

10 Claims, 8 Drawing Figures

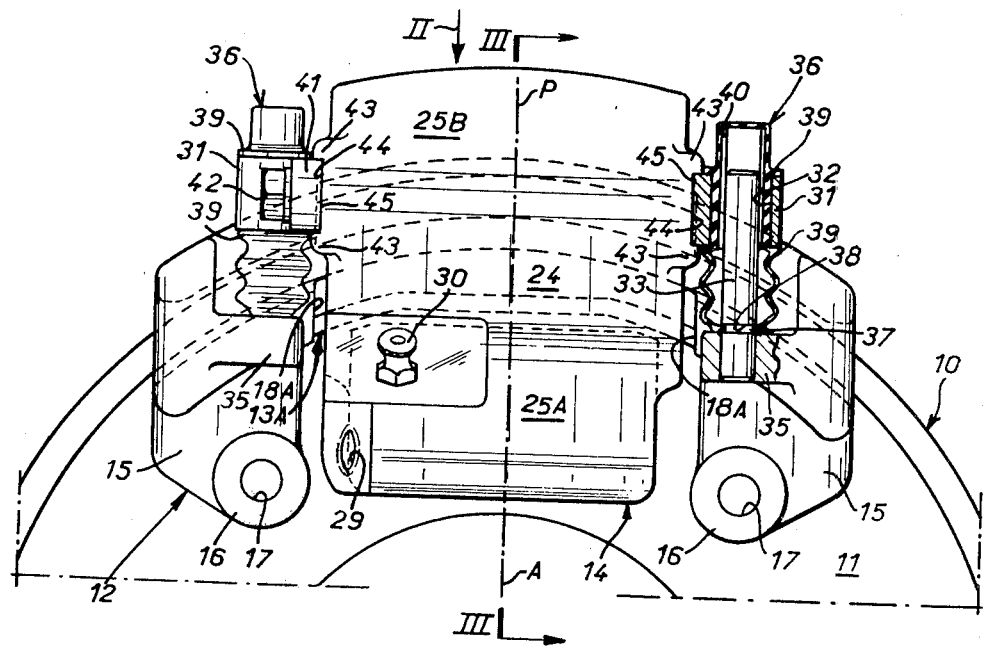
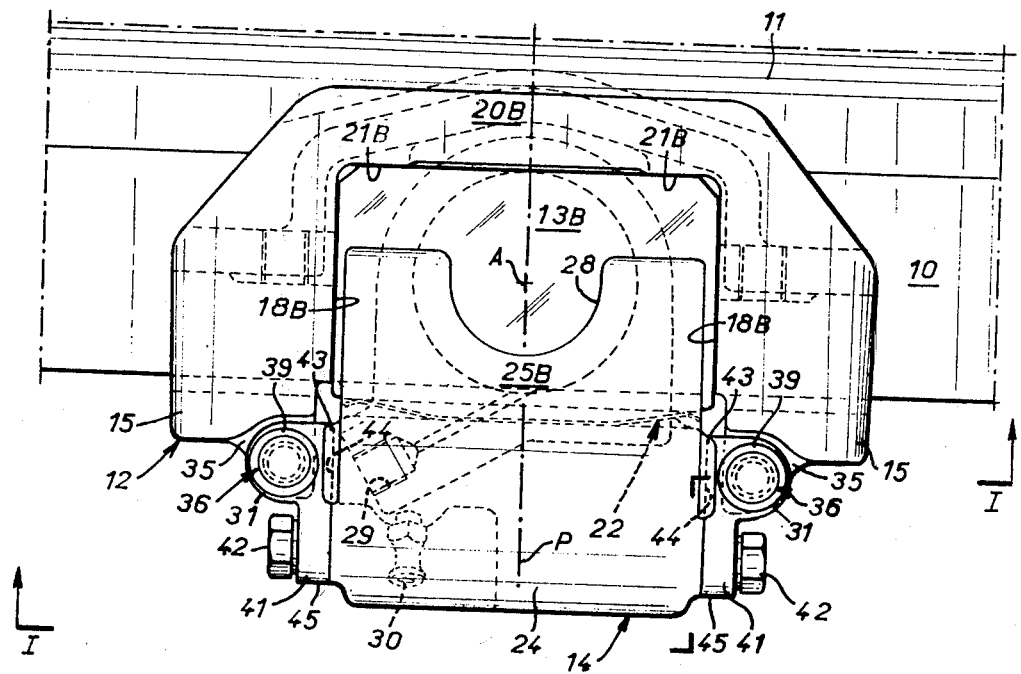

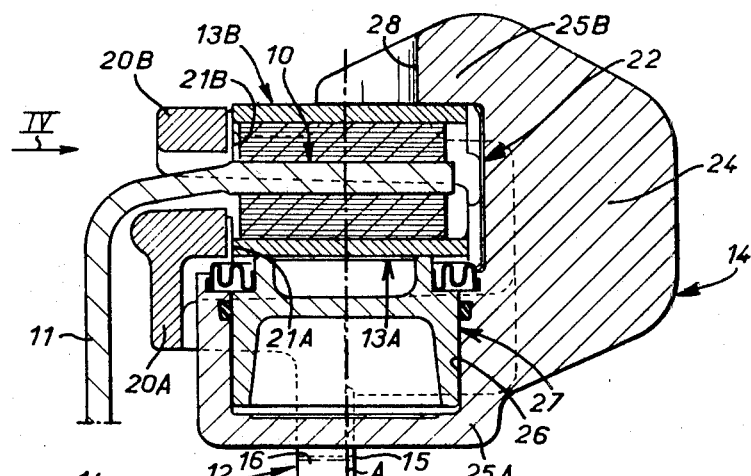
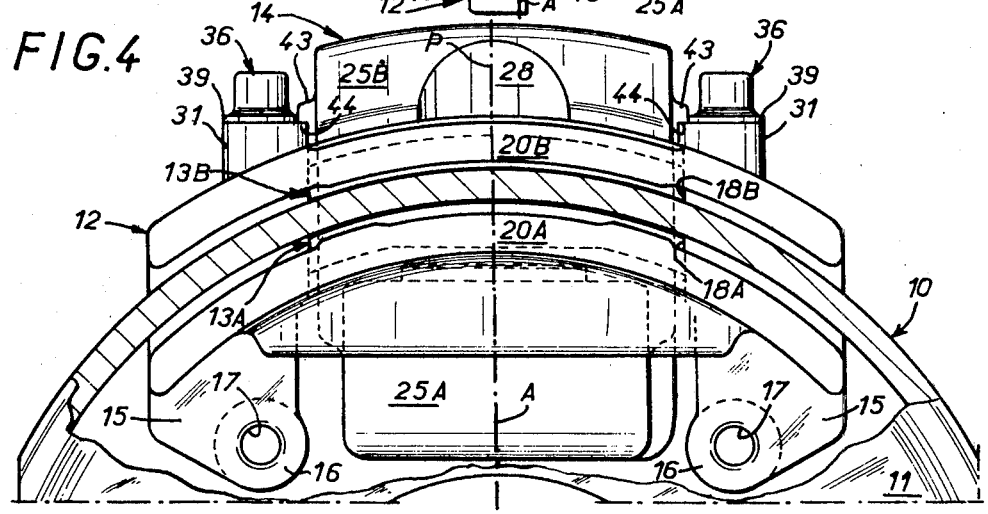
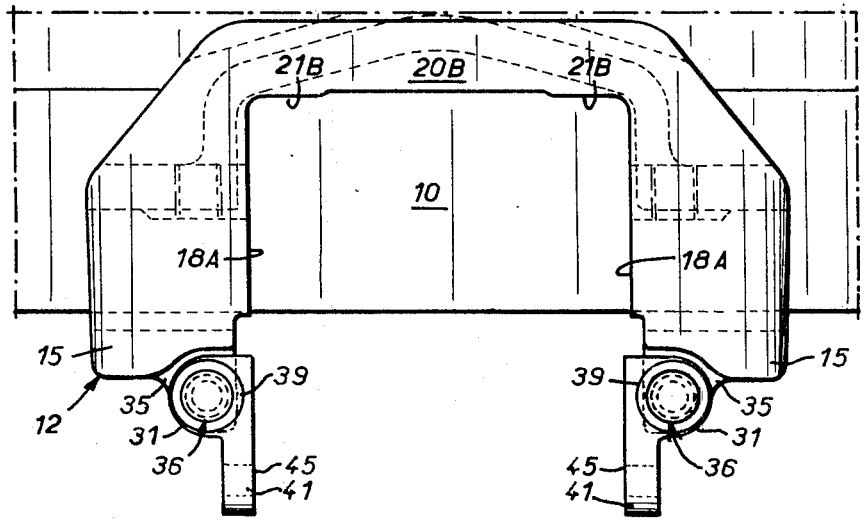

CROWN BRAKES

BACKGROUND OF THE INVENTION

The present invention relates to brakes for example for motor vehicles, of the kind in which the braking surfaces are formed on the axially—extending internal and external surfaces of a drum. Such brakes are generally referred to as "internal-external shoe drum brakes" or as "crown brakes". The latter term is used herein.

A brake of this kind comprises a fixed bracket, adapted to be attached to any support element, e.g. the journal of a braked wheel, to the shaft of which the corresponding drum or "crown" is keyed, two brake shoes arranged each respectively on either side of the crown, and control means adapted to act on said brake shoes to apply them to the braking surfaces formed on either side of the crown, the shoes being applied in a generally radial direction known as the clamping axis passing through the median zone of each of the brake shoes.

The present invention deals more particularly with the case in which the control means includes a generally C shaped control piece, commonly called the calliper, which extends radially on either side of the crown and of the brake shoes, and which exhibits, at the ends of a median part joining them mutually, on the one hand a first wing which is equipped with a clamping element whereby it can act upon a first of said brake shoes, and on the other hand a second wing, whereby it can act upon the second brake shoe, said control part being mounted to be radially movable in relation to the crown and being provided laterally for that purpose at least one guide lug, by the aperture of which it is engaged on a guide pin integral with the fixed bracket.

One difficulty which has to be overcome in the brakes of this kind results from the necessity to fulfil simultaneously two requirements; these are firstly to ensure with full security an appropriate lubrication of the calliper with reference to its guide pin or pins, in order to prevent incorrect sliding of said calliper on said pin or pins, which might prevent after braking, a proper withdrawal of the brake shoes with reference to the crown and thus lead to the untimely perpetuation of a residual braking torque generating more rapid wear of the brake shoes, and secondly to ensure easy access to the brake shoes for simple and rapid replacement thereof after wear.

Since access to the brake shoes generally implies the previous removal of the calliper, these two requirements are to some degree contradictory, since the achieving of good guidance of the calliper and of good conditions of lubrication for the corresponding sliding surfaces assumes the use of means leading to a confinement of the calliper by the fixed bracket, and therefore normally preventing the easy withdrawal of said calliper with reference to said fixed support.

It is a broad object of the invention to provide an arrangement which permits both the requirements in question to be satisfied in a simple and efficacious manner.

SUMMARY

The invention provides a brake of the kind comprising a fixed bracket, a rotary braked member in the form of a generally cylindrical crown, two brake shoes arranged each respectively on either side of the crown, and a generally C-shaped control part, or calliper, which extends radially on either side of the crown and of the brake shoes, and which includes, at the ends of a median part mutually connecting them, on the one hand a first wing which is fitted with a clamping element whereby it can act on a first of said brake shoes, and on the other hand a second wing, whereby it can act upon the second brake shoe, said control part or calliper being mounted for radial movement with reference to the crown and incorporating laterally for that purpose at least one guide lug having an aperture which is engaged by a guide pin integral with the fixed bracket, the brake being characterized in that the guide lug forms a part which is distinct from the calliper and which is detachably mounted thereto.

According to a first possible form of construction, known per se, the control part is provided with two guide lugs; in this case, according to the invention, each of said guide lugs forms a distinct detachable part.

As a variant, and likewise in manner known per se, the control part may be provided with only a single guide lug; in this case, the corresponding guide pin is usually of circular cross section, and at least one of the brake shoes is mounted to be radially slidable between two fixed stop surfaces with each of which it is capable of coming circumferentially into abutment, there being provided according to the invention, between the calliper and said brake shoe, in order to prevent during braking any rotation of the calliper about its guide pin by reason of the abutment with it of the resilient means which act in customary manner upon the brake shoes for their abutment against the fixed bracket, stop means of generally circumferential action, said stop means being located axially at a distance from the plane which passes through the axis of the clamping pin and which is perpendicular to the axis of the crown.

In order to have access to the shoes, it is sufficient to disconnect from the control part the guide lug or lugs with which it is equipped, it or they then remaining permanently on the fixed bracket, and to disengage the crown axially from said control part.

The guide lug or lugs thus remain permanently on the fixed bracket, and the conditions under which the lubrication of their contact surfaces with the guide pin or pins of the fixed bracket is performed are not disturbed by a withdrawal of the calliper, which advantageously ensures the permanence of this lubrication without it being necessary to act upon the latter after the control part has been returned into position.

In practice, according to a preferred embodiment of the invention, there is added to each guide pin a tubular bellows seal which passes through the aperture of the corresponding guide lug of the calliper and which is integrated radially for movement with the latter, said bellows defining a sealed lubrication volume independent of the attachment or otherwise of said guide lug to the control part.

Apart from the advantage of thus confining a definite lubrication volume, such a fingerstall-shaped bellows, which is generally made of resilient material, and which is inserted annularly between each guide pin of the fixed bracket and the aperture of the corresponding guide lug, has the further advantage of giving the control part in service a rocking capacity with reference to such a guide pin about an axis perpendicular to the axial plane of the brake passing through the clamping axis, permitting said control part to follow optimally the possible conical deformation to which the crown may possibly be subjected due to its heating.

BRIEF DESCRIPTION OF THE DRAWINGS

FIG. 1 is a partial view, partly in section and partly in elevation, of a crown brake, taken along the chain-dotted line I—I of FIG. 2;

FIG. 2 is a partial view in plan of this brake, taken in the direction of the arrow II of FIG. 1;

FIG. 3 is a view of the same brake in axial section, taken along the line III—III of FIG. 1;

FIG. 4 is another view of the same brake in elevation, taken in the direction of the arrow IV of FIG. 3, with part of the drum shown fragmented;

FIG. 5 is a view similar to that of FIG. 2, with the control part and the brake shoes removed;

DESCRIPTION OF THE PREFERRED EMBODIMENTS

Figure 6:
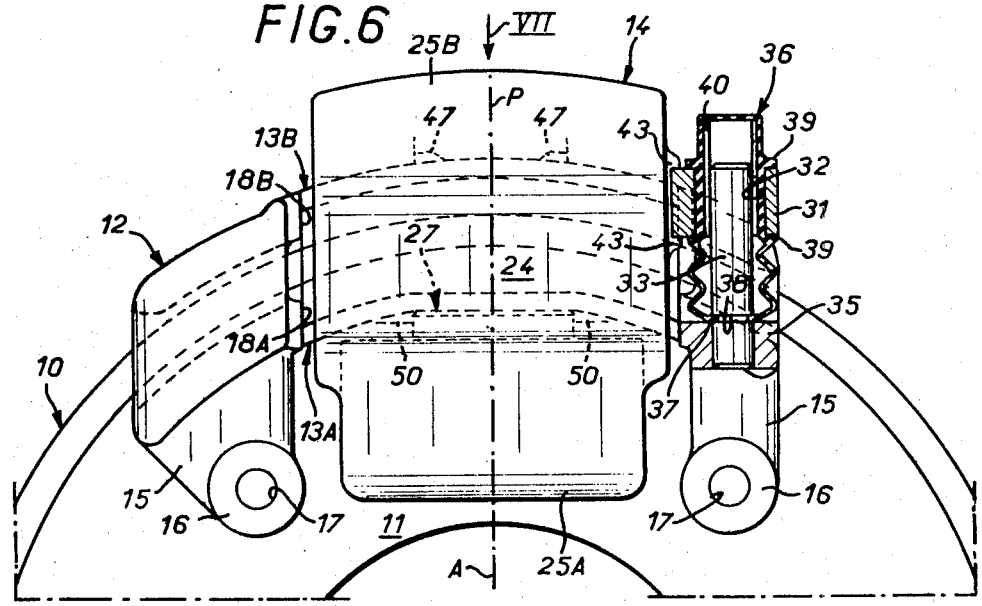
FIGS. 6 and 7 are views similar to those of FIGS. 1 and 2 respectively, but showing a different embodiment.

The drawings show a crown brake in which the rotary braked member comprises a drum (or crown) 10 elongated axially and having braking surfaces on both its internal and external annular surfaces, the drum 10 being supported by a flange 11 by which it can be attached to the shaft to be braked (not shown); it is for example a brake for a motor vehicle.

In manner known per se, said crown brake comprises a fixed bracket 12, two brake shoes 13A, 13B arranged each respectively on either side of the crown 10, the former for co-operation with the internal surface thereof, and the latter for co-operation with the external surface of said crown, and a control part or calliper 14, adapted to act upon the brake shoes 13A, 13B in order to apply them against the crown 10, in a generally radial direction A of the latter, hereinafter called the clamping axis, passing through the median zone of each of the brake shoes.

Said clamping axis A has been shown by broken lines in FIGS. 1, 3 and 4 and represented schematically by its outline in FIG. 2.

On either side of the axial plane P of the brake passing through the clamping axis A, hereinafter called the axial clamping plane and which is indicated schematically by its outline in the figures, the fixed bracket 12 forms two legs 15.

At their internal end said legs 15 each comprise a lug 16 through the aperture 17 of which the fixed bracket 12 can be attached to any desired support element, e.g. the journal of the braked wheel.

At their external end, the legs 15 follow the crown 10 in hook-shaped configuration, and on either side of the latter they form, for the brake shoes 13A, 13B, stop surfaces 18A, 18B between which said brake shoes are mounted for radial sliding movement, and against each of which they are capable of coming circumferentially into abutment.

On either side of the crown 10, the legs 15 of the fixed bracket are also connected circumferentially to each other, on the side axially opposite the control part 14, by bars 20A, 20B, and the latter form, for the brake shoes 13A, 13B, stop surfaces 21A, 21B against which said brake shoes are maintained axially in abutment by a spring 22 braced against the control part 14.

In manner known per se, said control part 14, which extends radially on either side of the crown 10 and of the brake shoes 13A 13B, has a generally C shaped configuration and comprises for that purpose, at the end of a median part 24 connecting them mutually, a first wing 25A which is recessed with a bore 26 forming a cylinder for a piston or clamping element 27 whereby it can act upon the brake shoe 13A, and a second wing 25B, the end of which is indented at 28 in the example illustrated, and whereby it can act upon the brake shoe 13B.

It is against the median part 24 of said control part 14 that the spring 22 acting upon the brake shoes 13A, 13B is braced.

Behind the piston 27, the cylinder 26 communicates with an orifice 29, FIGS. 1 and 2, whereby it can be connected to any source of pressurised fluid (not shown).

A bleed orifice 30 is likewise provided.

The control part 14 is mounted for radial movement with reference to the crown 10 and is provided for that purpose with at least one lateral guide lug 31 having an aperture 32 which is engaged on a guide pin 33 integral with the fixed bracket 12.

In the embodiment illustrated in FIGS. 1 to 4, the control part 14 is provided with two such guide lugs 31, and they are arranged on either side of the axial clamping plane P, on the circumferential flanks of the median part 24 of the control part 14.

In the embodiment illustrated, each guide pin 33 is attached, parallel to the clamping axis A, to a bracket 35 which axially projects for that purpose from the corresponding leg 15 or the fixed bracket 12.

Furthermore, in this embodiment, to the guide pin 33 there is attached a bellows seal 36, which has generally a fingerstall-shaped appearance.

The bellows seal 36 is fixed by its open end to the guide pin 33 and is provided with an annular bead 13 whereby it is engaged in a groove 38 of said pin.

By its median part, the bellows 36 passes through the aperture 32 of the corresponding guide lug 31 of the control part 14 and is fixed for radial movement therewith; for this purpose said median part is provided with two spaced transverse annular projections 39 which abut on either side of the relevant lug 31.

Thus, in this example, a guide lug 31 of the control part 14 is not directly in contact with the pin 33 with which it is engaged, as on the contrary the corresponding bellows 36, which is customarily made of resilient material, is inserted annularly between the aperture 32 of the lug and the pin 33.

Furthermore, in the embodiment illustrated, the bellows 36 is lined internally by a split socket 40 ensuring its contact with the pin 33.

According to the principal characteristic of the invention, each of the guide lugs 31 of the control part 14 is a separate part from the control part and each is fixed detachably thereto.

In practice, the guide lug 31 is integral with a claw 41 by which it is attached to the corresponding circumferential flank of the median part of the control part 14, e.g. by a screw 42 such as is illustrated.

Furthermore, in this embodiment, the circumferential flank carries two spaced protuberances 43 which together form a groove 44 parallel to the axis of the crown 10, and the corresponding lug 31 forms, with its claw 41, a complementary rib 45.

The control part 14 is therefore engaged axially by the grooves 44 on the rib 45 of each guide lug 31.

When pressurised fluid is passed into the bore forming the cylinder 26, the piston 27 applies the brake shoe 13A against the crown 10, and by sliding along the guide pins 33, the calliper 14 transmits the corresponding force to the brake shoe 13B, which is thus likewise applied against said crown 10; the latter is therefore clamped.

When the fluid pressure is relaxed, the crown 10 is released.

During such braking operations, the control part 14 is therefore permitted to move radially with reference to the crown 10, being guided in its movement by the guide pins 33.

It is likewise permitted to rock with reference to the guide pins 33, about an axis perpendicular to the axial clamping plane P, within the limits of the resilient radial crushing of the bellows seals 36 interposed annularly between said guide pins and the corresponding guide lugs 31.

If necessary, the control part 14 is thus capable of following conical deformation to which the crown 10 may be subject during braking, due to its heating.

For access to the brake shoes 13A 13B, e.g. for the purpose of replacing them when worn, it is sufficient to withdraw the screw 42 and to release from the crown 10 the control part 14, the latter then sliding axially by its grooves 44 along the ribs 45 of its guide lugs 31 which then remain in position on the guide pins 33 without prejudice to the corresponding lubrication.

Figure 7:
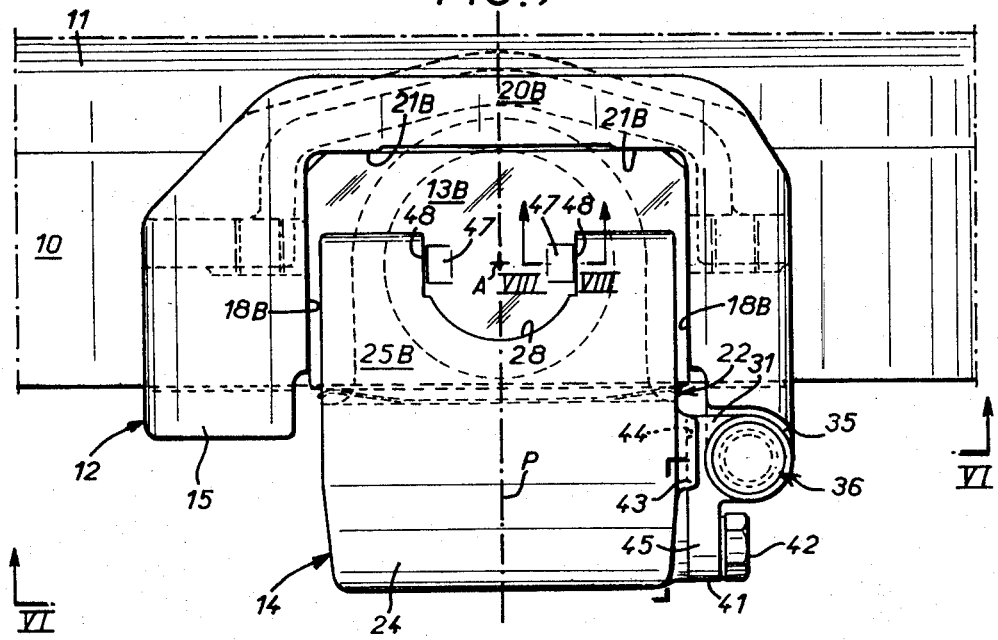
Figure 8:
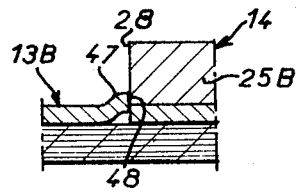
FIG. 8 is a partial view on a different scale in section of this variant, taken along the line VIII—VIII of FIG. 7.

In the embodiment illustrated in FIGS. 6 to 8, the control part 14 is provided with a single guide lug 31 only.

To prevent any rotation of the control part about the corresponding guide pin 33 in this variant, due to the forces to which it is subjected by the spring 22, according to the invention there are provided, between the control part 14 and at least one of the brake shoes 13A 13B, stop means of general circumferential action, said stop means being located axially at a distance from the plane which passes through the axis of the guide pin 33 and is perpendicular to the axis of the crown 10.

In the variant shown, such stop means are provided both on the brake shoe 13A and on the brake shoe 13B.

Dealing firstly with the brake shoe 13B, this comprises radially for this purpose at least one projection 47, and the latter exhibits, parallel to the axial clamping plane P, a bearing face 48 against which the control part 14 bears circumferentially, and more specifically, against which the internal surface of the indentation 28 carried by the wing 25B of the said control part 14 bears.

In practice, so that the brake may be fitted either on the right or on the left, the brake shoe 13B comprises two projections 47, and the bearing faces 48 of the latter are turned circumferentially in opposite directions, in order to co-operate with two diametrically opposite points of the indentation 28 of the wing 15B of the control part 14; in service only one of its projections is operative.

With regard to the brake shoe 13A, the latter likewise comprises radially a projection 50 against which the clamping member constituted by the piston 27 bears circumferentially.

In the embodiment shown, the brake shoe 13A in fact comprises two projections 50, and the latter frame the piston 27 circumferentially at two diametrically opposite points thereof.

The present invention is not limited to the embodiment described and illustrated, includes all variants and modifications within the scope of the appended claims.

I claim:

1. A brake of the kind comprising a fixed bracket, a rotary braked member in the form of a generally cylindrical crown having annular braking surfaces on the internal and external surfaces thereof, brake shoes arranged one on each side of said crown, and a calliper extending radially on either side of said crown and said brake shoes and which comprises a first wing member which is provided with a clamping element adapted to act on a first of said brake shoes, a second wing member adapted to act on the second brake shoe, and a median part connecting the first and second wing members, said calliper being mounted for radial movement relative to the crown and being provided for that purpose with at least one lateral guide lug, said guide lug being formed with an aperture which is engaged on a guide pin integral with said fixed bracket, wherein said guide lug is formed as a separate part from the calliper and is detachably mounted thereon.

2. A brake according to claim 1, wherein the calliper is provided with two guide lugs, and each of said guide lugs are formed as a separate part from the calliper and are detachably mounted thereon.

3. A brake according to claim 1, wherein the calliper is provided with only one guide lug, and wherein, for at least one of the brake shoes, the fixed bracket forms two stop surfaces between which the said brake shoe is mounted for radial sliding movement, and against each of which said brake shoe is capable of coming circumferentially into abutment, and wherein between said calliper and said brake shoe there are provided stop means of generally circumferential action, said stop means being located axially at a distance from the plane which passes through the axis of the guide pin and which is perpendicular to the axis of the crown.

4. A brake according to claim 3, wherein the second brake shoe includes a radial projection constituting said stop means, and said projection is formed, parallel to the axial plane of the brake containing the axis of the clamping element, with a bearing face against which the calliper bears circumferentially.

5. A brake according to claim 4, wherein two projections are provided on the second brake shoe and their bearing faces are turned circumferentially in opposite directions.

6. A brake according to claim 3, wherein said first brake shoe includes a radial projection constituting said stop means against which the clamping member bears circumferentially.

7. A brake according to claim 6, wherein two projections are provided on the first brake shoe which frame the clamping member circumferentially.

8. A brake according to claim 1, wherein for each detachable guide lug, the calliper is formed with a groove axially engaged with a rib on the respective guide lug.

9. A brake according to claim 1, wherein each detachable guide lug is fixed to the calliper by a screw.

10. A brake according to claim 1, wherein a tubular bellows seal is provided between the guide pin and the calliper, which bellows seal is received within the aperture of the corresponding guide lug and which is moveable with the guide lug.

* * * * *